United States Patent
Horn

(10) Patent No.: US 6,912,643 B2
(45) Date of Patent: Jun. 28, 2005

(54) METHOD OF FLEXIBLY MAPPING A NUMBER OF STORAGE ELEMENTS INTO A VIRTUAL STORAGE ELEMENT

(75) Inventor: Robert Horn, Yorba Linda, CA (US)

(73) Assignee: Aristos Logic Corporation, Foothill Ranch, CA (US)

(*) Notice: Subject to any disclaimer, the term of this patent is extended or adjusted under 35 U.S.C. 154(b) by 295 days.

(21) Appl. No.: 10/294,562

(22) Filed: Nov. 15, 2002

(65) Prior Publication Data

US 2004/0034736 A1 Feb. 19, 2004

Related U.S. Application Data

(60) Provisional application No. 60/404,136, filed on Aug. 19, 2002.

(51) Int. Cl.[7] .............................................. G06F 12/00
(52) U.S. Cl. ........................ 711/202; 711/112; 711/114; 711/202; 711/218; 711/219; 711/220; 711/221; 714/5; 714/6; 714/7
(58) Field of Search ................................ 711/4, 6, 112, 711/114, 161–162, 202–203, 218–221, 170–173; 714/1–7

(56) References Cited

U.S. PATENT DOCUMENTS

| | | | |
|---|---|---|---|
| 5,367,669 A | | 11/1994 | Holland et al. |
| 5,537,567 A | * | 7/1996 | Galbraith et al. ........... 711/114 |
| 5,574,851 A | * | 11/1996 | Rathunde ........................ 714/7 |
| 5,574,882 A | | 11/1996 | Menon et al. |
| 5,696,934 A | | 12/1997 | Jacobson et al. |
| 5,835,694 A | * | 11/1998 | Hodges ......................... 714/6 |
| 6,101,590 A | * | 8/2000 | Hansen ...................... 711/203 |
| 6,195,730 B1 | | 2/2001 | West |
| 6,636,941 B1 | * | 10/2003 | Gold et al. .................. 711/112 |
| 2002/0103889 A1 | * | 8/2002 | Markson et al. ............ 709/223 |
| 2003/0084241 A1 | * | 5/2003 | Lubbers et al. ............. 711/114 |
| 2003/0140210 A1 | * | 7/2003 | Testardi ...................... 711/203 |

* cited by examiner

Primary Examiner—Donald Sparks
Assistant Examiner—Hashem Farrokh
(74) Attorney, Agent, or Firm—Dickstein Shapiro Morin & Oshinsky LLP

(57) ABSTRACT

The present invention provides an architecture and method for increasing the performance and resource utilization of networked storage architectures by use of hardware-based storage element mapping. The architecture utilizes a customized programmable processing element to map host read or write commands to physical storage element commands. The present invention uses a plurality of data structures, such as tables, to map host read and write commands to physical storage elements. The hardware-based storage element mapping controller uses the tables, including a mapping segment descriptor table, to map from global address space addresses to physical storage element addresses.

19 Claims, 3 Drawing Sheets

METHOD OF FLEXIBLY MAPPING A NUMBER OF STORAGE ELEMENTS INTO A VIRTUAL STORAGE ELEMENT

CROSS-REFERENCE TO RELATED APPLICATIONS

This application is related to U.S. application Ser. No. 09/716,195, filed Nov. 17, 2000, the disclosure of which is herein incorporated in its entirety by reference, and claims the benefit of U.S. Provisional Application No. 60/404,136, filed Aug. 19, 2002.

FIELD OF THE INVENTION

The present invention relates to a mapping system for networked storage systems.

BACKGROUND OF THE INVENTION

With the rapidly accelerating growth of Internet and intranet communication, high-bandwidth applications (such as streaming video), and large information databases, the need for networked storage systems has increased dramatically. Of particular concern is the performance level of networked storage, especially in high-utilization and high-bandwidth use models. A key determinant in the performance of a networked storage system is the function of mapping data to storage elements.

Conventional network storage system architectures rely heavily on software implementation of mapping techniques. Unfortunately, software-mapping approaches significantly limit system flexibility and performance. Hardware-mapping approaches have been developed to address these performance limitations. Such a system is described in U.S. Pat. No. 6,195,730, entitled, "Computer System With Storage Device Mapping Input/Output Processor," which is hereby incorporated by reference. However, conventional hardware-mapping implementations such as disclosed in U.S. Pat. No. 6,195,730, do not allow for the level of complex mapping functions that can fully maximize networked storage system performance and resource utilization.

SUMMARY OF THE INVENTION

The present invention provides an architecture and method for hardware-based storage element mapping. The invention provides an increased number of networked storage system mapping functions per second and increases the flexibility of hardware-based networked storage system mapping. The invention also enables logical volumes that are independent of physical volume size.

The architecture of the present invention utilizes a customized programmable processing element to scan for available mapping segment descriptors (MSDs) upon receipt of a host data volume read or write request. A mapping engine then generates a set of parameters used to create a command list. Multiple logical volumes may be written across a single set of storage elements. Storage elements may include physical storage (e.g. hard disk drives) or virtualized storage.

DETAILED DESCRIPTION OF THE PREFERRED EMBODIMENT

The present invention is described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure is thorough and complete, and fully conveys the scope of the invention to those skilled in the art.

Figure 1:
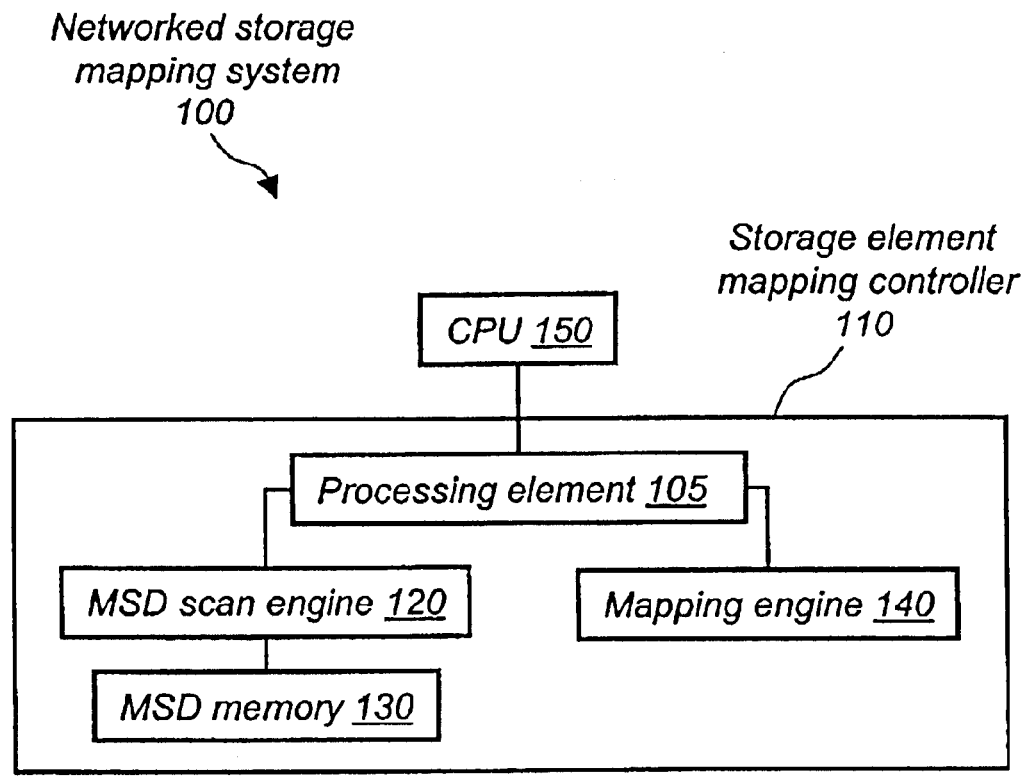
FIG. 1 is an exemplary architecture for a disk mapping controller (DMC) in accordance with the present invention.

FIG. 1 illustrates an exemplary networked storage mapping system architecture 100 used for hardware-accelerated storage element mapping functions. Networked storage mapping system architecture 100 includes a CPU 150 and a storage element mapping controller 110. Storage element mapping controller 110 includes a processing element 105, a mapping segment descriptor (MSD) scan engine 120, a MSD memory 130 and a mapping engine 140.

Networked storage mapping system architecture 100 is an element within a larger computer system typically containing memory (not shown), fixed storage (not shown), and input and output functionality (not shown). In the preferred embodiment of the present invention, the storage element is a hard disk drive in a RAID system. Accordingly, storage element mapping controller 110 is a disk mapping controller (DMC) 110 in the preferred embodiment of the present invention. To enable the flow of data within networked storage mapping system architecture 100, CPU 150 interfaces with processing element 105 of storage element mapping controller (DMC) 110. MSD scan engine 120 interfaces with MSD memory 130 and processing element 105. Mapping engine 140 also interfaces with processing element 105.

As described more fully hereinafter, MSDs map portions (segments or "slices") of storage elements (e.g., disks)—up to and including entire storage elements.

In operation, a request to read or write a logical volume is submitted to storage element mapping controller 110 from CPU 150. Processing element 105, which is a customized programmable processor with a RISC-like instruction set, determines the starting MSD number for the logical volume. In the present invention, a range of one to thirty-two MSDs is allowed per logical volume. Processing element 105 accesses from MSD memory 130 a table of all MSDs available on networked storage mapping system architecture 100, as well as the LBA range that is the target of the read or write command submitted from CPU 150. The MSD table and LBA range are input into MSD scan engine 120, which identifies the MSDs that contain the LBA range, in accordance with a predefined granularity, and outputs to processing element 105 all of the MSDs that contain the LBA range being sought by the read or write command. By defining two or more MSDs with overlapping LBA ranges, a mirror is created.

Based on the MSDs chosen above (for a read command) or the MSDs being written to (for a write command), mapping engine 140 receives from processing element 105 the LBA range, the mapping type (that is, concatenation, striping, and/or mirroring, or striping with parity), the number of available storage element partitions, and the stripe size. Concatenation indicates a group of disks/storage elements that are not set up as any type of striping or parity configuration. Striping is storage element striping only, which interleaves data across multiple storage elements for better performance. Mirroring is storage element mirroring, in which data is duplicated across two or more storage elements for redundancy. Striping with parity indicates a method in which data is striped across three or more drives for performance, and parity bits are used for fault tolerance.

Based on the received parameters, mapping engine 140 calculates the read or write ranges for the storage element. In other words, mapping engine 140 converts a single contiguous logical volume into multiple smaller volumes on multiple storage elements. Mapping engine 140 then outputs a set of parameters used to create specific storage element commands. Processing element 105 converts the parameters into actual storage element commands and generates a list of storage element commands and parity operations, which are then utilized to combine data on the identified storage elements.

The following modifiers are supported in the MSD structure: 1) a defective storage element modifier, which is used to mark individual storage elements as defective when a volume is degraded; and 2) an initialize modifier, which is used to effect integrity in the operation of read and write operations.

Figure 2:
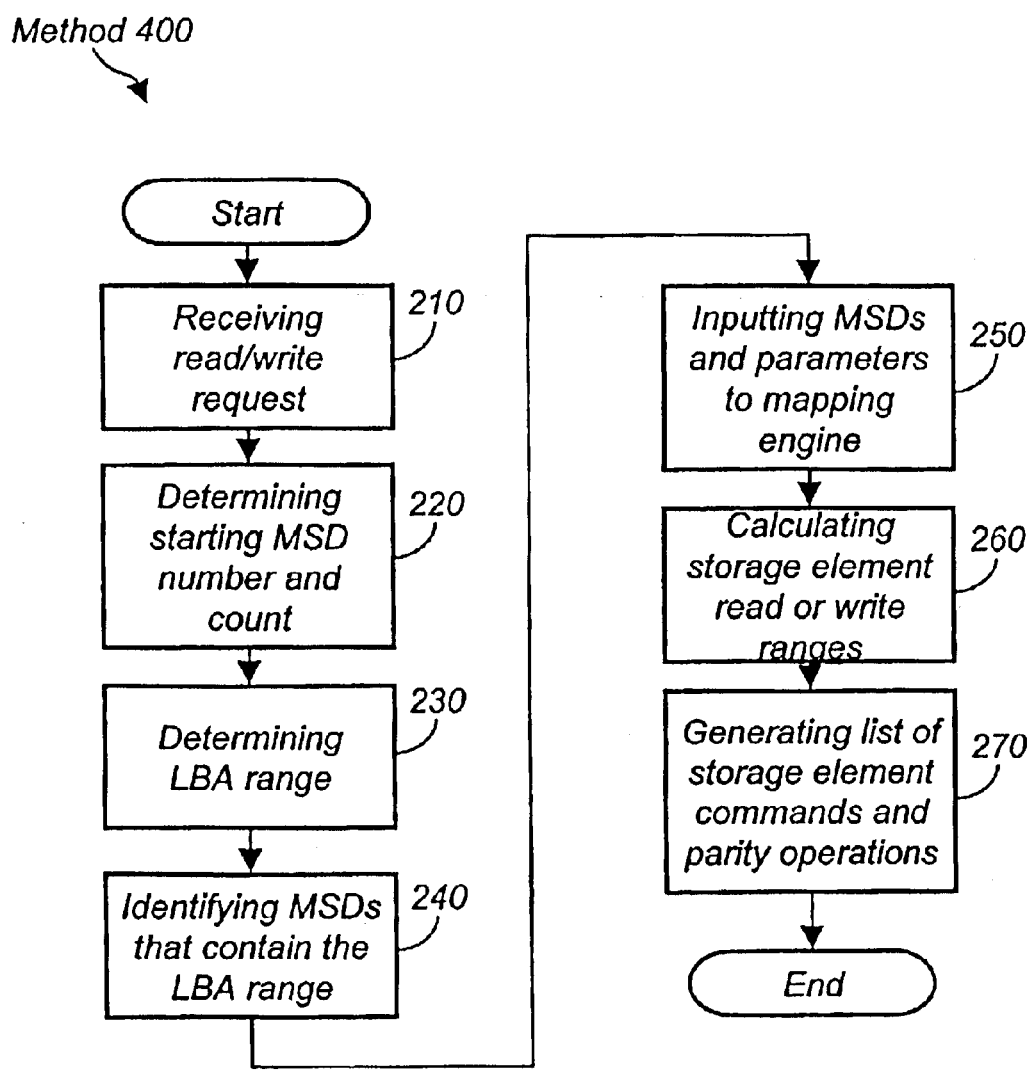
FIG. 2 is an exemplary method for hardware-based networked storage mapping in accordance with the present invention.

FIG. 2 illustrates a method of hardware-based networked storage mapping, including the following steps:

Step 210: Receiving Read/Write Command

In this step, a request to read or write a logical volume is received by processing element 105 of storage element mapping controller 110 from CPU 150.

Step 220: Determining Starting MSD Number and Count

In this step, processing element 105 determines the starting MSD number for the logical volume. Processing element 105 also determines the MSD count from a table stored on MSD memory 130. In the present invention, a range of up to 32 MSDs is allowed per logical volume.

Step 230: Determining LBA Range

In this step, processing element 105 retrieves from MSD memory 130 a table of all MSDs available on networked storage mapping system 100. Processing element 105 also determines the LBA range that is the target of the read or write request received from CPU 150. One MSD may completely cover a given LBA range or multiple MSDs may be combined to achieve full coverage of the LBA range.

Step 240: Identifying MSDs That Contain the LBA Range

In this step, the MSD table and the LBA range are input into MSD scan engine 120, which identifies the MSDs that contain the LBA range determined in step 230, in accordance with a pre-defined granularity, and outputs to processing element 105 all of the MSDs that contain the LBA range being sought by the read or write command. The granularity of each MSD (as measured with respect to the number of LBAs) is measured as power-of-two sectors. For example, an MSD may be one megabyte in size, but may not be one-half of a megabyte. In another example, an MSD may be 32 or 33 megabytes in size (but not 32½ megabytes) for a granularity of 1 megabyte. Any given volume may violate these power-of-two boundaries. When this violation occurs, the volume scan is done in two steps: the portion of the volume on one side of the power-of-two boundary is scanned first, and the portion of the volume on the other side of the power-of-two boundary is scanned second. For example, for 32½ megabytes, the 32 megabytes would be scanned first and the ½ megabyte would be scanned second. These scans are then processed separately by processing element 105.

Step 250: Inputting MSDs and Parameters to Mapping Engine

In this step, mapping engine 140 accepts as input from processing element 105 the LBA range determined in step 230, the MSDs that contain the LBA range (identified in step 240) and the mapping type (that is, concatenation, striping, and/or mirroring, or striping with parity).

Step 260: Calculating Storage Element Read or Write Ranges

In this step, mapping engine 140 calculates the read or write ranges for the storage element. In other words, mapping engine 140 converts a single contiguous logical volume to multiple smaller volumes on multiple storage elements. Mapping engine 140 then outputs a set of parameters used to create storage element commands.

Step 270: Generating List of Storage Element Commands and Parity Operations

In this step, processing element 105 formats the parameters output from mapping engine 140 in step 260 into actual storage element commands and generates a list of storage element commands and parity operations, which are then utilized to combine data on the identified storage elements. This step is supported by microcode in processing element 105 of storage element mapping controller 110.

Figure 3:
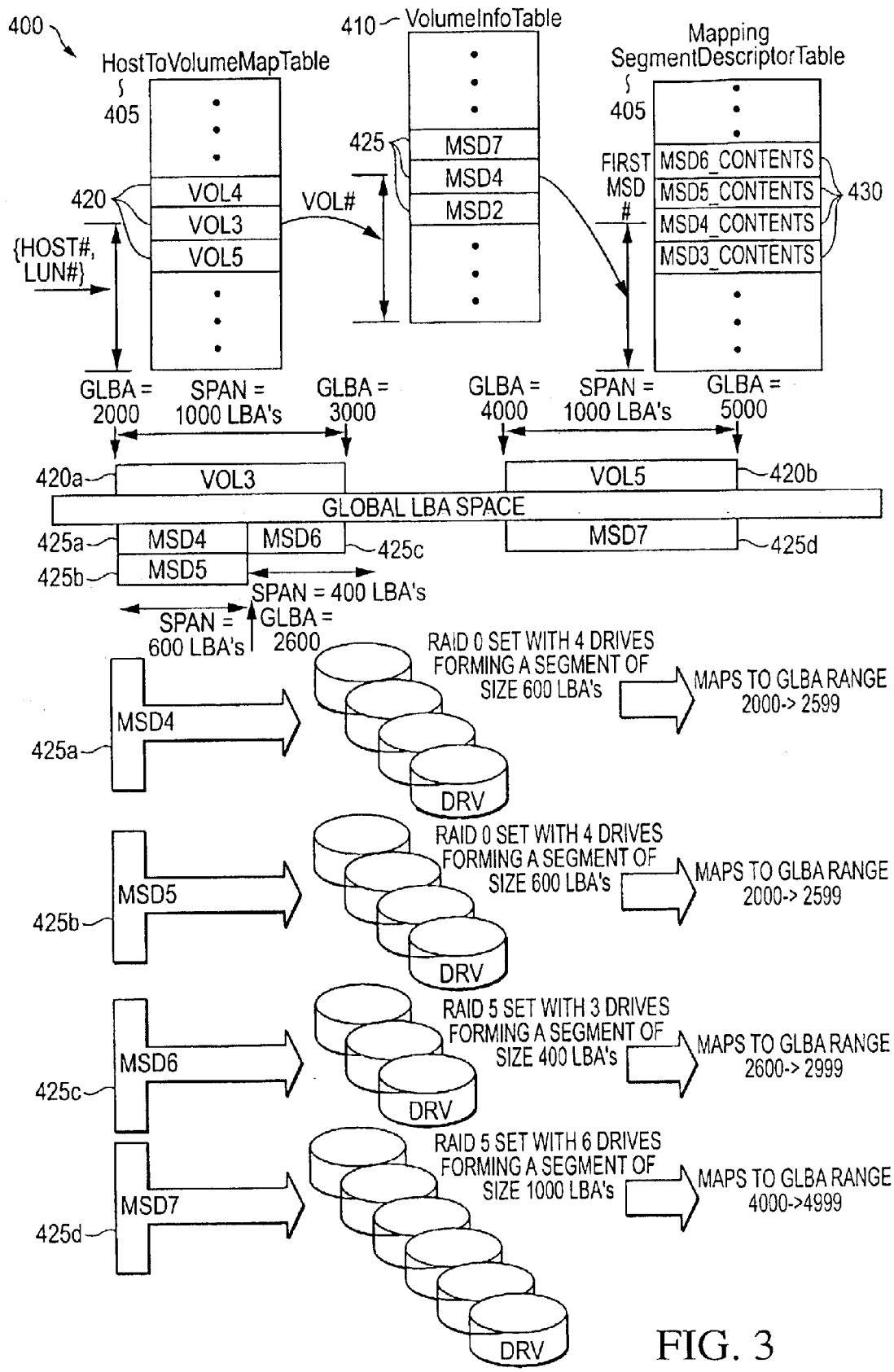
FIG. 3 is an exemplary flow diagram of the disk mapping method of the present invention, including exemplary data structures.

FIG. 3 is an exemplary implementation of the present invention to effect mapping host read and write commands in a RAID system 400. A read or write command is received and includes a host identification number and a logical unit number (LUN), which are used to determine, via HostToVolumeMapTable 405, a volume number 420. The volume number is then used as an index into another table of volume descriptors, namely VolumeInfoTable 410. Each of the entries of the VolumeInfoTable 410 describes a volume including a starting LBA of the particular volume, the length/size/count of the particular volume in terms of logical block addresses (LBAs) and the first mapping segment descriptor (MSD) 425 associated with the particular volume. The starting LBA and the count/length map the volume to a location which starts at the starting LBA and ends at the starting LBA plus volume span/count/length.

The first MSD is a pointer to a MSD table 415. Each of the entries 430 in the MSD table 415 include the segment starting LBA, the segment length/count/span, the RAID type, the number of members/drives and the starting drive physical/disk LBA offset. The segment starting LBA and the segment span/count map the segment to a location which starts at the segment starting LBA and ends at the segment starting LBA plus the segment span/count/length.

Two examples of the use of the above described structure follow. In the first example, assume using HostToVolumeMapTable 405 that the host identification number and LUN map to logical volume 3 (VOL 3) 420*a* where VOL3 420*a* starts at global LBA (GLBA) 2000 and has a length of 1000 LBAs. Using the Volume Info Table 410, it is determined that VOL3 420*a* comprises MSD4 425*a*, MSD5 425*b* and MSD6 425*c*. MSD4 425*a* and MSD5 235*b* each span 600 LBAs and MSD6 425*c* spans 400 LBAs. Since MSD4 425*a* and MSD5 425*b* have overlapping LBAs, a mirror for these segments is created. MSD4 425*a* and MSD5 425*b* each, therefore, start at GLBA 2000 with a count/span of 600 LBAs, ending at GLBA 2599. MSD6 425*c* starts at GLBA 2600 with a span/count of 400 LBAs ending at GLBA 2999. MSD4 425*a* and MSD5 425*b* are each a RAID 0 set with four disk drives each forming a segment of size 600 LBAs. MSD6 425*c* is a RAID 5 set with three disk drives forming a segment of 400 LBAs.

In the second example, assume using the HostToVolumeMapTable 405 that the host identification number and the LUN map to VOL5 420b, where VOL5 420b starts at GLBA 4000 and spans 1000 LBAs. Using the VolumeInfoTable 410, it is determined that VOL5 420b comprises MSD7 425d, which spans 1000 LBAs. MSD7 is a RAID 5 set with six disk drives forming a segment of 1000 LBAs.

Although the present invention has been described in relation to particular embodiments thereof, many other variations and modifications will become apparent to those skilled in the art. Therefore, the present invention is to be limited not by the specific disclosure herein, but only by the appended claims.

What I claim is:

1. A method for flexibly mapping host read and write commands into physical volume storage element commands comprising the steps of:

receiving one of a read command and a write command;

determining a logical volume corresponding to the command, including a starting global logical block address (GLBA), a count, and a GLBA range;

identifying mapping segment descriptors (MSDs) that contain said GLBA range and parameters;

forwarding said MSDs to a hardware mapping engine, and said hardware mapping engine calculating for each MSD one of a read range and a write range for each of the physical storage elements specified by the MSD; and generating a list of physical storage element commands to perform said host read and write commands in the specified storage element ranges.

2. A method for flexibly mapping host read and write commands into physical volume storage element commands, comprising the steps of:

receiving one of a read command and a write command;

identifying mapping segment descriptors (MSDs) that contain a logical block address range and parameters, including the steps of:
      determining a MSD starting GLBA and a count; and
      determining a MSD ending GLBA;

forwarding said MSDs to a hardware mapping engine, and said hardware mapping engine calculating for each MSD one of a read range and a write range for each of the physical storage elements specified by the MSD; and generating a list of physical storage element commands to perform said host read and write commands in the specified storage element ranges.

3. The method according to claim 1, wherein data is striped.

4. The method according to claim 2, wherein said striping is performed with parity.

5. The method according to claim 2, wherein said striping is performed without parity.

6. The method according to claim 1, wherein data is mirrored.

7. The method according to claim 5, wherein said mirroring is performed with parity.

8. The method according to claim 5, wherein said mirroring is performed without parity.

9. The method according to claim 1, wherein data is stored on concatenated storage elements.

10. A method for flexibly mapping host read and write commands into physical volume storage element commands, comprising the steps of:

receiving one of a read command and a write command;

identifying mapping segment descriptors (MSDs) that contain a global logical block address (GLBA) range and parameters, wherein said GLBA range is determined in accordance with a pre-defined granularity;

forwarding said MSDs to a hardware mapping engine, and said hardware mapping engine calculating for each MSD one of a read range and a write range for each of the physical storage elements specified by the MSD; and generating a list of physical storage element commands to perform said host read and write commands in the specified storage element ranges.

11. The method according to claim 1, wherein logical volumes are independent of physical volume sizes.

12. A method for flexibly mapping host read and write commands into physical volume storage element commands, comprising the steps of:

receiving one of a read command and a write command;

identifying mapping segment descriptors (MSDs) that contain a global logical block address (GLBA) range and parameters, wherein said MSDs have a structure that supports a defective storage element modifier, which is used to mark individual storage elements as defective when a volume is degraded;

forwarding said MSDs to a hardware mapping engine, and said hardware mapping engine calculating for each MSD one of a read range and a write range for each of the physical storage elements specified by the MSD; and generating a list of physical storage element commands to perform said host read and write commands in the specified storage element ranges.

13. A method for flexibly mapping host read and write commands into physical volume storage element commands, comprising the steps of:

receiving one of a read command and a write command;

identifying mapping segment descriptors (MSDs) that contain a global logical block address (GLBA) range and parameters, wherein said MSDs have a structure that supports an initialize modifier, which is used to effect integrity in both read and write operations;

forwarding said MSDs to a hardware mapping engine, and said hardware mapping engine calculating for each MSD one of a read range and a write range for each of the physical storage elements specified by the MSD; and generating a list of physical storage element commands to perform said host read and write commands in the specified storage element ranges.

14. The method according to claim 1, wherein physical storage element volumes are equal size with respect to a number of sectors.

15. The method according to claim 1, wherein physical storage elements need not be equal in size.

16. A network storage system architecture for storage element mapping comprising:

a central processing unit (CPU); and a storage element mapping controller in communication with said CPU, said storage element mapping controller comprising:
       a processing element;
       a mapping segment descriptor (MSD) scan engine, said MSD scan engine in communication with said processing element;

a mapping engine in communication with said processing element; and an MSD memory in communication with said MSD scan engine;

wherein said processing engine receives host volume read and write commands from said CPU, determines a logical volume, determines a starting global logical block address (GLBA), determines a count, determines a GLBA range, forwards said GLBA range to said MSD scan engine, receives mapping segment descriptors (MSDs) identified by said MSD scan engine from said MSD scan engine, forwards said identified MSDs to said mapping engine, receives parameters from said mapping engine and generates a list of physical storage element commands to perform said host read and write commands.

17. A network storage system architecture for storage element mapping comprising:

a central processing unit (CPU); and a storage element mapping controller in communication with said CPU, said storage element mapping controller comprising:

a processing element;

a mapping segment descriptor (MSD) scan engine, said MSD scan engine in communication with said processing element;

a mapping engine in communication with said processing element; and an MSD memory in communication with said MSD scan engine;

wherein said MSD scan engine receives a GLBA range from said processing engine, identifies all mapping segment descriptors (MSDs) that contain a global logical block (GLBA) range corresponding to host volume read and write commands forwarded to said storage element mapping controller from said CPU, and forwards said identified MSDs to said processing engine.

18. A network storage system architecture for storage element mapping comprising:

a central processing unit (CPU); and a storage element mapping controller in communication with said CPU, said storage element mapping controller comprising:

a processing element;

a mapping segment descriptor (MSD) scan engine, said MSD scan engine in communication with said processing element;

a mapping engine in communication with said processing element; and an MSD memory in communication with said MSD scan engine;

wherein said mapping engine accepts mapping segment descriptors (MSDs) from said processing engine, calculates for each MSD one of a read range and a write range of physical storage elements, identifies parameters and forwards said parameters and said one of said read range and said write range to said processing engine.

19. The architecture according to claim 16, wherein said CPU forwards host read and write commands to said storage element mapping controller.

* * * * *